United States Patent
Fukushima et al.

(10) Patent No.: US 6,983,156 B2
(45) Date of Patent: Jan. 3, 2006

(54) INFORMATION PROCESSING APPARATUS AND COMMUNICATION SETTING METHOD

(75) Inventors: Kazuya Fukushima, Haruma (JP); Koichi Kaji, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 10/255,831

(22) Filed: Sep. 27, 2002

(65) Prior Publication Data

US 2003/0073438 A1    Apr. 17, 2003

(30) Foreign Application Priority Data

Sep. 28, 2001    (JP)    ............................. 2001-304657

(51) Int. Cl.
*H04Q 7/20*    (2006.01)
(52) U.S. Cl. ............................. 455/456.1; 455/456.6; 342/357.09
(58) Field of Classification Search ................ 455/434, 455/456.1–456.6, 457, 414.1, 424, 418–420; 342/357.06, 357.09, 357.1
See application file for complete search history.

(56) References Cited

U.S. PATENT DOCUMENTS

| | | | | |
|---|---|---|---|---|
| 5,581,261 A | * | 12/1996 | Hickman et al. | ........... 342/385 |
| 5,635,940 A | | 6/1997 | Hickman et al. | |
| 5,678,182 A | * | 10/1997 | Miller et al. | ................ 455/12.1 |
| 5,857,155 A | * | 1/1999 | Hill et al. | ................ 455/456.3 |
| 5,864,764 A | * | 1/1999 | Thro et al. | ................... 455/561 |
| 5,910,799 A | * | 6/1999 | Carpenter et al. | .......... 715/866 |
| 5,940,509 A | * | 8/1999 | Jovanovich et al. | ........ 713/191 |
| 6,085,098 A | * | 7/2000 | Moon et al. | ................. 455/457 |
| 6,275,677 B1 | * | 8/2001 | Tandler | ...................... 455/12.1 |
| 6,484,029 B2 | * | 11/2002 | Hughes et al. | .............. 455/434 |
| 6,539,230 B2 | * | 3/2003 | Yen | .......................... 455/456.1 |

FOREIGN PATENT DOCUMENTS

| | | |
|---|---|---|
| EP | 1 037 482 A2 | 9/2000 |
| EP | 1 098 477 A1 | 5/2001 |
| JP | 11-32111 | 2/1999 |
| JP | 2000-286856 | 10/2000 |
| WO | WO 01/62034 | 8/2001 |

OTHER PUBLICATIONS

IBM TEchnical Disclosure Bulletin,"Automated Configuration For Country Specific Software Packages", Oct. 1, 1993, Issue No. 36, vol. 36, pp. 379-380.*

* cited by examiner

*Primary Examiner*—Charles N. Appiah
(74) *Attorney, Agent, or Firm*—Finnegan, Henderson, Farabow, Garrett & Dunner, L.L.P.

(57) ABSTRACT

When an access point receives radio waves from a GPS satellite and acquires its own position information, it sends a beacon signal containing the acquired information to a PC over a wireless LAN. If the PC receives the beacon signal containing the position information from the access point, it starts initializing the wireless LAN function of the PC. Specifically, the PC analyzes the position information sent from the access point, derives a region to which the position indicated by the position information belongs, and updates the setting information in a flash memory so as to conform to the radio communication standard of the derived region. At the same time, the updated setting information is set onto the operations (frequency band, transmission power) of the wireless LAN card.

10 Claims, 7 Drawing Sheets

| ch. | CENTER FREQUENCY MHz | NORTH AMERICA FCC | EUROPE ETSI | SPAIN | FRANCE | JAPAN |
|---|---|---|---|---|---|---|
| 1 | 2412 | ○ | ○ | | | ○ |
| 2 | 2417 | ○ | ○ | | | ○ |
| 3 | 2422 | ○ | ○ | | | ○ |
| 4 | 2427 | ○ | ○ | | | ○ |
| 5 | 2432 | ○ | ○ | | | ○ |
| 6 | 2437 | ○ | ○ | | | ○ |
| 7 | 2442 | ○ | ○ | | | ○ |
| 8 | 2447 | ○ | ○ | | | ○ |
| 9 | 2452 | ○ | ○ | | | ○ |
| 10 | 2457 | ○ | ○ | ○ | ○ | ○ |
| 11 | 2462 | ○ | ○ | ○ | ○ | ○ |
| 12 | 2467 | | ○ | | ○ | ○ |
| 13 | 2472 | | ○ | | ○ | ○ |
| 14 | 2483 | | | | | ○ |

| TRANSMISSION POWER | NORTH AMERICA | JAPAN | ... |
|---|---|---|---|
| 50mW | ○ | ○ | ... |
| 100mW | ○ | | ... |
| ... | | | ... |

FIG. 4

| ch. | CENTER FREQUENCY MHz | NORTH AMERICA FCC | EUROPE ETSI | SPAIN | FRANCE | JAPAN |
|---|---|---|---|---|---|---|
| 1 | 2412 | ○ | ○ | | | ○ |
| 2 | 2417 | ○ | ○ | | | ○ |
| 3 | 2422 | ○ | ○ | | | ○ |
| 4 | 2427 | ○ | ○ | | | ○ |
| 5 | 2432 | ○ | ○ | | | ○ |
| 6 | 2437 | ○ | ○ | | | ○ |
| 7 | 2442 | ○ | ○ | | | ○ |
| 8 | 2447 | ○ | ○ | | | ○ |
| 9 | 2452 | ○ | ○ | | | ○ |
| 10 | 2457 | ○ | ○ | ○ | ○ | ○ |
| 11 | 2462 | ○ | ○ | ○ | ○ | ○ |
| 12 | 2467 | | ○ | | ○ | ○ |
| 13 | 2472 | | ○ | | ○ | ○ |
| 14 | 2483 | | | | | ○ |

SETTING OF USABLE FREQUENCY BAND AT TIME OF SHIPMENT

| ch. | 1 | 2 | 3 | ... | 9 | 10 | 11 | 12 | 13 | 14 |
|---|---|---|---|---|---|---|---|---|---|---|
| SETTING | 0 | 0 | 0 | ... | 0 | 1 | 1 | 0 | 0 | 0 |

FIG. 9

SETTING OF USABLE FREQUENCY BAND FOR NORTH AMERICA

| ch. | 1 | 2 | 3 | ... | 9 | 10 | 11 | 12 | 13 | 14 |
|---|---|---|---|---|---|---|---|---|---|---|
| SETTING | 1 | 1 | 1 | ... | 1 | 1 | 1 | 0 | 0 | 0 |

FIG. 10

SETTING OF USABLE FREQUENCY BAND FOR JAPAN

| ch. | 1 | 2 | 3 | ... | 9 | 10 | 11 | 12 | 13 | 14 |
|---|---|---|---|---|---|---|---|---|---|---|
| SETTING | 1 | 1 | 1 | ... | 1 | 1 | 1 | 1 | 1 | 0 |

FIG. 11

SETTING OF TRANSMISSION POWER AT TIME OF SHIPMENT

| TRANSMISSION POWER (mW) | 50 | 100 |
|---|---|---|
| SETTING | 1 | 0 |

FIG. 12

SETTING OF TRANSMISSION POWER FOR NORTH AMERICA

| TRANSMISSION POWER (mW) | 50 | 100 |
|---|---|---|
| SETTING | 1 | 1 |

FIG. 13

SETTING OF TRANSMISSION POWER FOR JAPAN

| TRANSMISSION POWER (mW) | 50 | 100 |
|---|---|---|
| SETTING | 1 | 0 |

FIG. 14

SETTING (●) MANUAL   ( ) AUTO

COUNTRY
- ( ) JAPAN
- ( ) NORTH AMERICA
- (●) EUROPE
  ⋮

CHANNEL
- (●) 1ch  (●) 2ch  (●) 3ch
- - - - - - - - - - - - - - - -
- (●) 9ch  (●) 10ch  (●) 11ch
- (●) 12ch  ( ) 13ch  ( ) 14ch

TRANSMISSION POWER
- (●) 50mW  ( ) 100mW  - - - - -

000# INFORMATION PROCESSING APPARATUS AND COMMUNICATION SETTING METHOD

CROSS-REFERENCE TO RELATED APPLICATIONS

This application is based upon and claims the benefit of priority from the prior Japanese Patent Application No. 2001-304657, filed Sep. 28, 2001, the entire contents of which are incorporated herein by reference.

BACKGROUND OF THE INVENTION

1. Field of the Invention

The present invention relates to an information processing apparatus and a communication setting method.

2. Description of the Related Art

Recently, there have been many kinds of information processing apparatuses (e.g., personal computers, mobile information terminals) having radio communication functions (e.g., wireless LAN communication functions, Bluetooth™ communication functions). The radio communication functions of such apparatuses may be built in, or provided by external equipment such as cards.

Individual countries have their own radio communication standards relating to wireless communications. When information processing apparatuses are to be shipped to a certain country, the radio communication function needs to conform to the radio communication standard of the country.

However, the radio communication standard varies from country to country. For example, usable frequency bands and transmission powers are different among countries. Thus, different settings for countries have to be made in the radio communication functions, leading to difficult pre-shipment steps and troublesome management.

In order to cope with this problem, for example, the radio communication function may be set to a worldwide radio communication standard so as to be applicable to any country. In this case, however, the frequency band and transmission power are very restricted, and the performance of the radio communication function may not fully be exhibited in the chosen country.

On the other hand, the country (or region) for shipment of information processing apparatuses may be restricted so that fixed values of the frequency band and transmission power are set to the radio communication function. In this case, however, the radio communication function may not accord to the radio communication standards of the countries other than the designated country, and the information processing apparatuses could not be shipped to such other countries.

BRIEF SUMMARY OF THE INVENTION

Embodiments of the present invention provide an information processing apparatus capable of fully exhibiting an operation performance of radio communication functions in countries for shipment, and a communication setting method for the same.

According to one aspect of the present invention, there is provided an information processing apparatus, comprising a communication unit capable of executing communication; a memory configured to store first setting information that enables communication in a first region, and second setting information that enables communication in a second region; an information acquiring unit configured to acquire region information relating to a region where the apparatus is present; and a processing unit configured to set one of the first and second setting information stored in the memory onto operations of the communication unit, on the basis of the region information acquired by the information acquiring unit.

According to another aspect of the present invention, there is provided an information processing apparatus, comprising a communication device capable of executing communication; a memory configured to store first setting information that enables communication in a first region, and second setting information that enables communication in a second region; a setting unit configured to set information which concerns about communication setting information relating to a region; and a processing unit configured to set one of the first and second setting information stored in the memory onto operations of the communication device, on the basis of the region information set by the setting unit.

According to still another aspect of the present invention, there is provided an information processing apparatus, comprising a communication device configured to execute communication; a memory configured to store a plurality of setting information which concerns about radio communication; an information acquiring device configured to acquire region information; and a processing unit configured to enable the communication device according to one of the plurality of setting information stored in the memory, on the basis of the region information acquired by the information acquiring device.

According to still another aspect of the present invention, there is provided a communication setting method for an information processing apparatus having a communication unit capable of executing communication, the method comprising storing first setting information that enables communication in a first region and second setting information that enables communication in a second region, in a memory provided to the information processing apparatus; acquiring region information relating to a region where the apparatus is present; and setting one of the first and second setting information stored in the memory onto operations of the communication unit, on the basis of the acquired region information.

According to still another aspect of the present invention, there is provided a communication setting method for an information processing apparatus having a communication unit capable of executing communication, the method comprising storing in a memory, setting information that conforms to communication standards of any region for shipment of the apparatus; acquiring another setting information that conforms to a communication standard of a region to which a position of the apparatus belongs, from another communication device capable of communicating with the communication unit; updating the setting information stored in the memory with the acquired another setting information; and setting the updated setting information onto operations of the communication unit.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
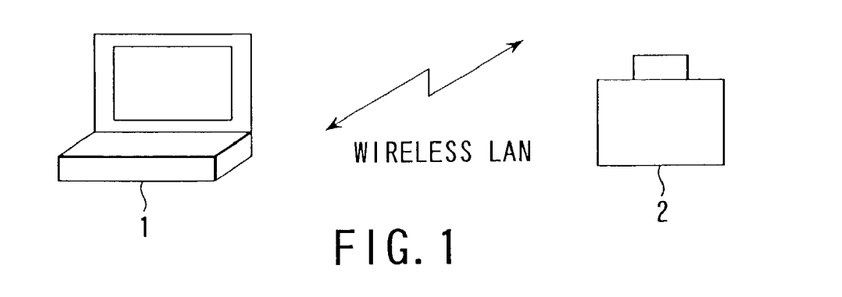
FIG. 1 illustrates a radio communication system including an information processing apparatus (PC) according to an embodiment of the present invention.

FIG. 1 illustrates a radio communication system including an information processing apparatus according to an embodiment of the present invention. In this embodiment, a personal computer (hereinafter abbreviated as "PC") is used as an example of the information processing apparatus.

The PC 1 is an information processing apparatus to be shipped to any one of the regions (countries). It has a wireless LAN communication function as an example of the radio communication function. Prior to shipment, the PC 1 stores, in a memory medium, setting information conforming to radio communication standards in all regions (countries) for shipment. The setting information in this context includes usable frequencies of radio waves output from the PC 1 and a value of transmission power.

After shipment of the PC 1, the setting information stored in the memory medium in the PC 1 is rewritten (or updated) so as to conform to the radio communication standard of the region (country) to which the shipped PC 1 belongs. The rewritten setting information is set onto the operations of the wireless LAN communication function.

On the other hand, an access point 2 performs radio communication with the PC 1 having the wireless LAN communication function, and can also connect to a wired LAN. The access point 2 sends position information indicative of the position of the PC 1, region (country) information indicative of the region (country) where the PC 1 is present, or setting information conforming to the radio communication standard of the region (country) where the PC 1 is present, to the PC 1, as desired.

Figure 2:
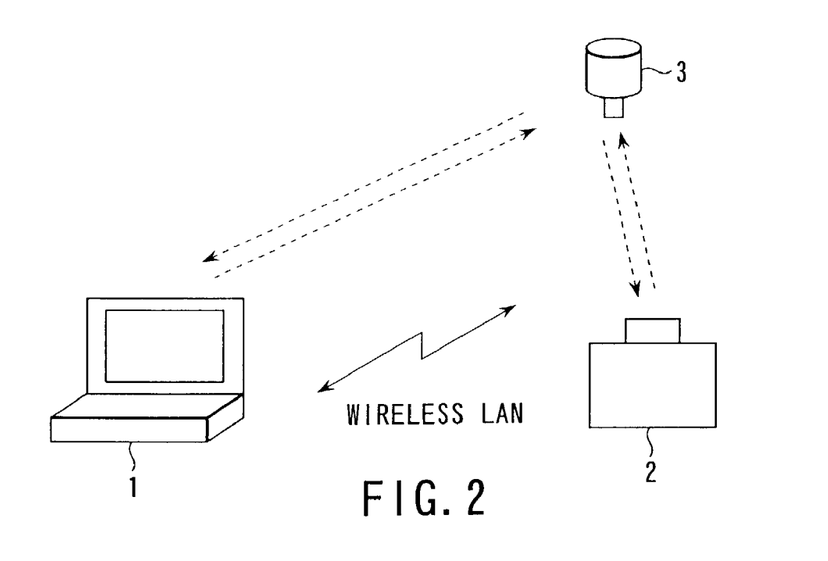
FIG. 2 illustrates a state of information communication performed after shipment of the information processing apparatus (PC)

FIG. 2 illustrates a state of information communication performed after shipment of the information processing apparatus (PC).

It is necessary that the frequency band or radio wave output used by the PC 1 for radio communication in the region (country), to which the PC 1 has been shipped, be made to conform to the radio communication standard in the region. In this case, the following methods may be adopted.

(1) The access point 2 receives radio waves from a GPS (Global Positioning System) satellite 3 and acquires its own position information (latitude and longitude information, etc.). Based on the acquired position information, the access point 2 generates setting information conforming to the radio communication standard of the region (country) where the access point 2 is currently operated. The access point 2 sends the generated setting information to the PC 1 over a wireless LAN by a command. The PC 1 receives the setting information from the access point 2 and updates the setting information in the memory medium with the received one. The updated setting information is set onto the operation of the radio communication function.

Alternatively, a process of acquiring position information from the GPS satellite 3 may be omitted, and setting information to be sent to the PC 1 may be pre-stored in the access point 2.

(2) The access point 2 receives radio waves from the GPS satellite 3 and acquires its own position information. The access point 2 sends the acquired position information to the PC 1 over the wireless LAN. The PC 1 receives the position information from the access point 2 and updates the setting information in the memory medium so as to conform to the radio communication standard of the region (country) where the position indicated by the position information belongs. The updated setting information is set onto the operation of the radio communication function.

Alternatively, a process of acquiring position information from the GPS satellite 3 may be omitted, and position information to be sent to the PC 1 may be pre-stored in the access point 2.

(3) In a case where the access point 2 does not have the function of sending setting information or position information, the PC 1 itself receives radio waves from the GPS satellite 3 and obtains its own position information, thereby obtaining the region (country) where the position indicated by the position information belongs. The PC 1 updates the setting information in the memory medium so as to conform to the radio communication standard of the region (country) where the position indicated by the position information belongs. The updated setting information is set onto the operation of the radio communication function.

Figure 3:
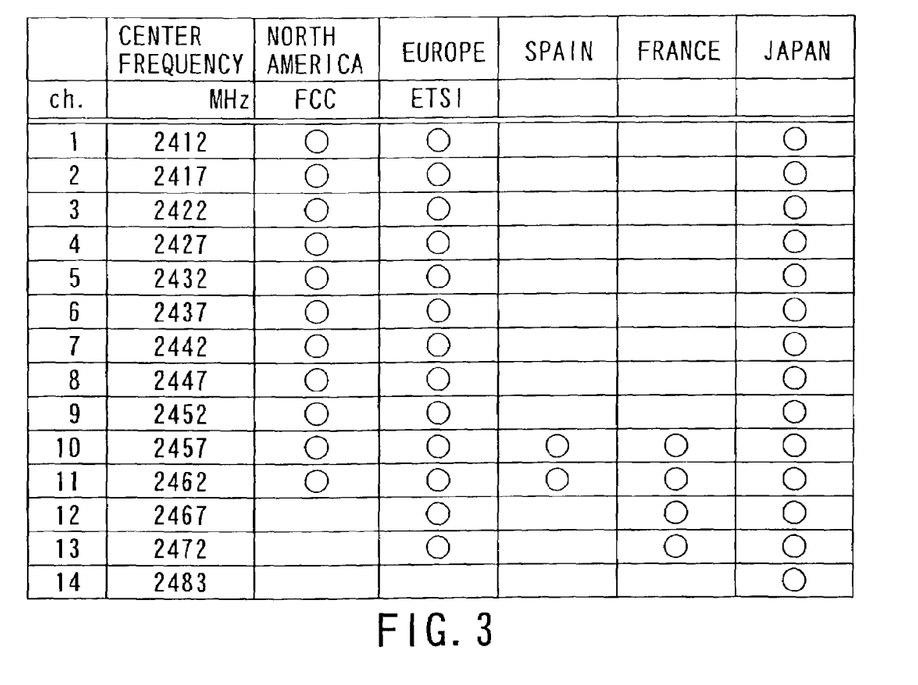
FIG. 3 is a table showing frequency bands (channels) specified by radio communication standards in the respective countries.

FIG. 3 is a table showing frequency bands (channels) specified by radio communication standards in the respective countries.

As is shown in FIG. 3, the usable frequency bands (channels) vary from country to country. For example, in Japan, channels (Ch.) 1–14 are usable. In Spain, however, only channels 10 and 11 are usable. According to this table, the worldwide usable channels are Ch. 10 and Ch. 11. In the PC 1 before shipment, setting information indicating Ch. 10 and Ch. 11 is registered in the memory medium. In short, in the PC 1, only channels that are usable in any country with no problem are initially set. In the PC 1 after shipment, the setting information is updated with new setting information indicating channels conforming to the radio communication standards in the country for shipment.

Figure 4:
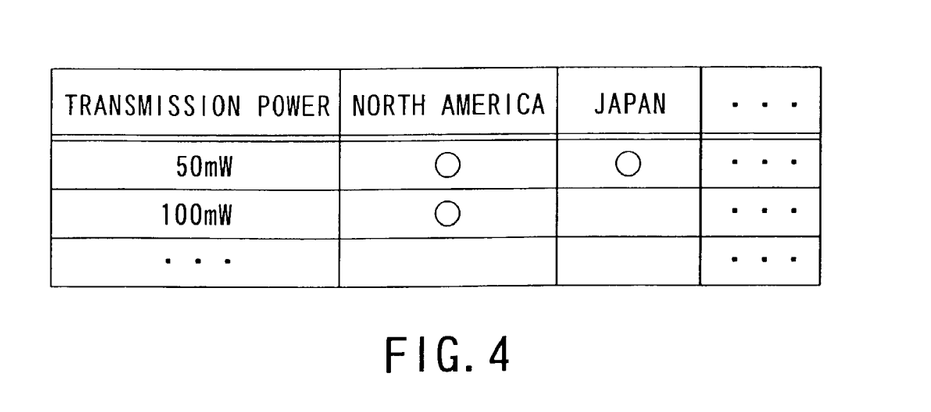
FIG. 4 is a table showing maximum transmission powers specified by radio communication standards in the respective countries.

FIG. 4 is a table showing maximum transmission powers specified by radio communication standards in the respective countries.

As is shown in FIG. 4, the usable maximum transmission powers vary from country to country. For example, in Japan, 50 mW at maximum is usable. In North America, 100 mW at maximum is usable. According to the table, the worldwide usable transmission powers are up to 50 mW. In the PC 1 before shipment, setting information indicating 50 mW is registered in the memory medium. In this case, the transmission power value may be set below 50 mW if the value conforms to the radio communication standard. Thus, manufacturers can set the transmission power at a desired value. In other words, the transmission power value may be set within the range of the radio communication standards in the countries where the PC 1 is to be used. After shipment of the PC 1, the setting information is updated with new setting information indicating the transmission power conforming to the radio communication standard in the country for shipment.

Figure 5:
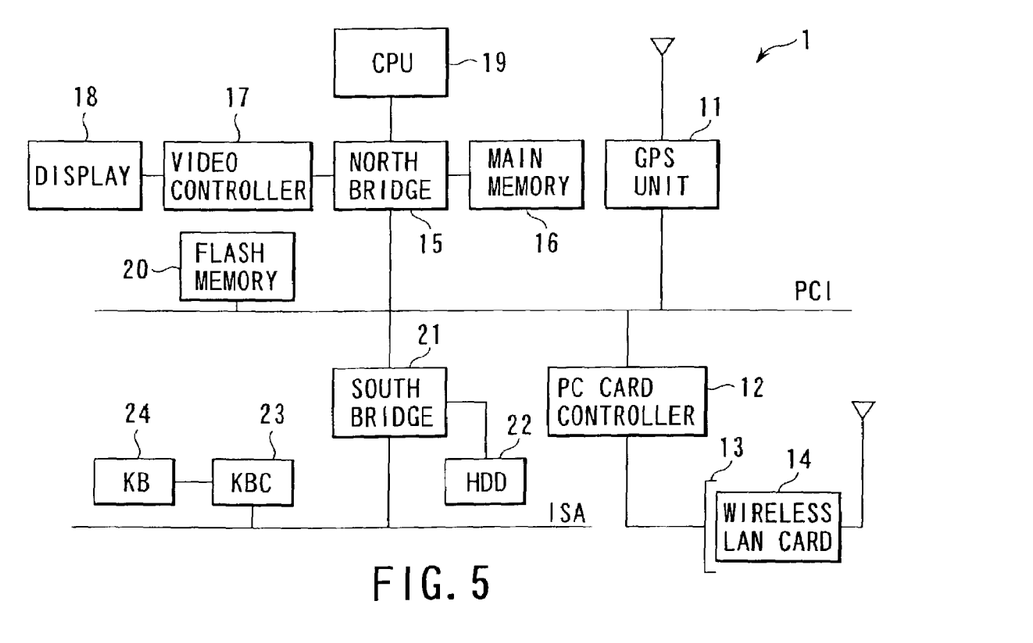
FIG. 5 is a block diagram showing an example of the structure of the information processing apparatus (PC)

FIG. 5 is a block diagram showing an example of the structure of the information processing apparatus (PC 1).

A GPS unit 11 is provided in the PC 1, where necessary. The GPS unit 11 receives radio waves from the GPS satellite 3 and acquires its own position information.

A PC card controller 12 conforms to specifications of PCMCIA (Personal Computer Memory Card International Association) and controls a PC card loaded in a card slot 13.

The card slot 13 functions to receive the PC card.

A wireless LAN card 14 is realized in the form of a PC card conforming to specifications of PCMCIA. The wireless LAN card 14 is controlled by the PC card controller 12 and performs wireless LAN communication with a wireless LAN communication function provided in some other device.

A north bridge 15 performs bus-bridge processing between a CPU 19 and a PCI bus, a control for a main memory 16, and a control for a video controller 17.

The main memory 16 stores various programs and data to be executed by the CPU 19 and is provided as a work area for the CPU 19.

The video controller 17 performs a control for data to be displayed on a display 18.

The display 18 can display, e.g., a setting screen that enables the user to alter setting information such as usable frequency bands of radio communication functions and values of transmission power.

The CPU 19 controls the entirety of the PC 1 and executes on the main memory 16 programs for realizing, e.g., the radio communication setting method according to the present embodiment.

A flash memory 20 contains all setting information relating to usable frequency bands of radio communication functions and values of transmission power for each region (country). Before shipment of the PC 1, worldwide usable channel numbers and transmission power values are stored as setting information. After shipment of the PC 1, the CPU 19 updates the setting information with new setting information conforming to the radio communication standard of the region (country) for shipment. The information stored in the flash memory 20 may be retained in the main memory 16.

A south bridge 21 performs bus-bridge processing between the PCI bus and an ISA bus, and a control for a HDD (22).

The HDD 22 is used to store programs and data to be used by the CPU 19.

A keyboard controller 23 controls a keyboard 24.

The keyboard 24 is used as an input apparatus.

In the above example of the structure, an architecture including a north bridge and a south bridge is adopted. Alternatively, another architecture may be adopted.

Figure 6:
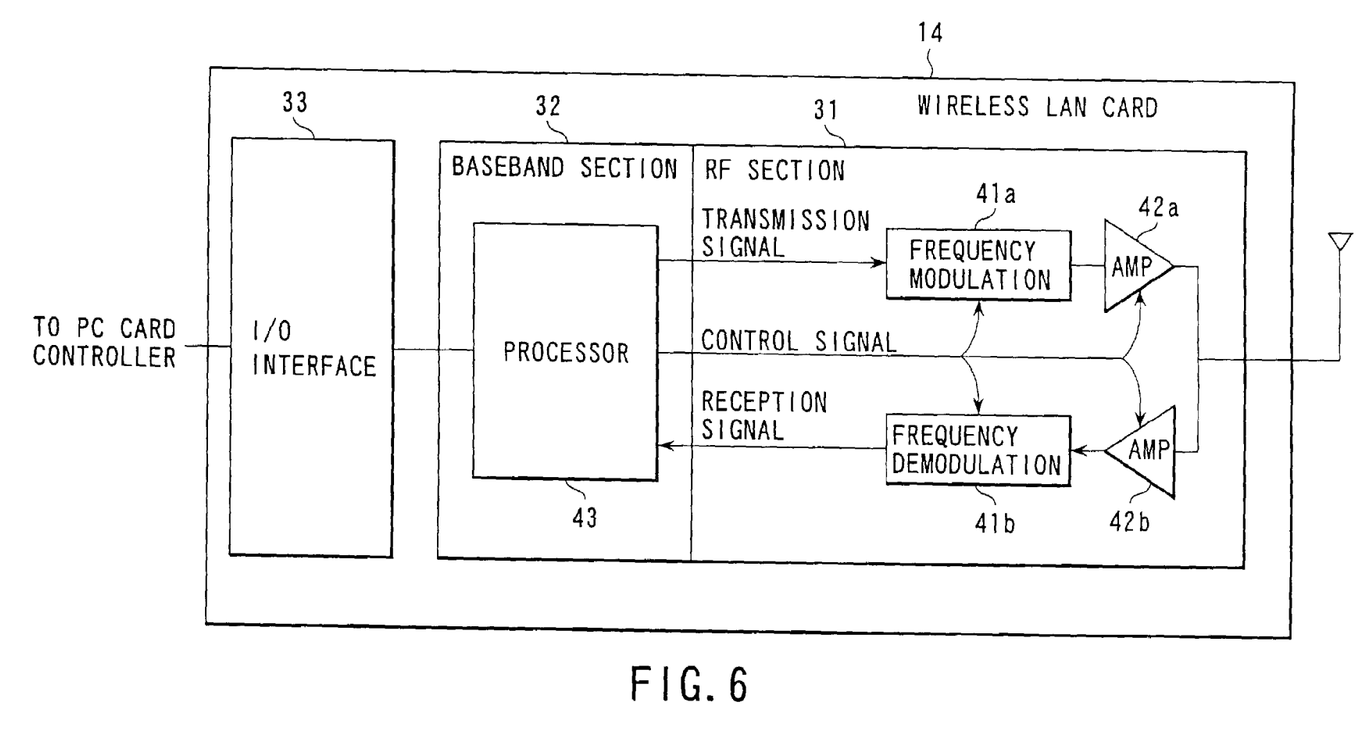
FIG. 6 is a block diagram showing an example of the internal structure of a wireless LAN card shown in FIG. 5.

FIG. 6 is a block diagram showing an example of the internal structure of the wireless LAN card 14 shown in FIG. 5.

The wireless LAN card 14 includes an RF section 31 and a baseband section 32, which constitute a wireless LAN module, and also includes an I/O interface 33, and a MAC processing section (not shown).

The RF section 31 includes a frequency modulation section 41a, a frequency demodulation section 41b, and amplifiers 42a and 42b. The RF section 31 performs 2.4 GHz-band radio communication (conforming to IEEE 802.11b or IEEE 802.11g) via an antenna.

The baseband section 32 includes a processor 43 and performs various controls, e.g., a control for the RF section 31, a link control, a packet control, a logic channel control, and a security control.

The I/O interface 33 effects I/O interface between the wireless LAN module (including RF section 31 and baseband section 32) and the PC card controller.

In the above structure, the processor 43 of baseband section 32 sends control signals to the frequency modulation section 41a, frequency demodulation section 41b and amplifiers 42a and 42b of the RF section 31. The control signals set and alter the frequencies and power values of transmission signals to be transmitted to the outside and reception signals to be received from the outside.

Figure 7:
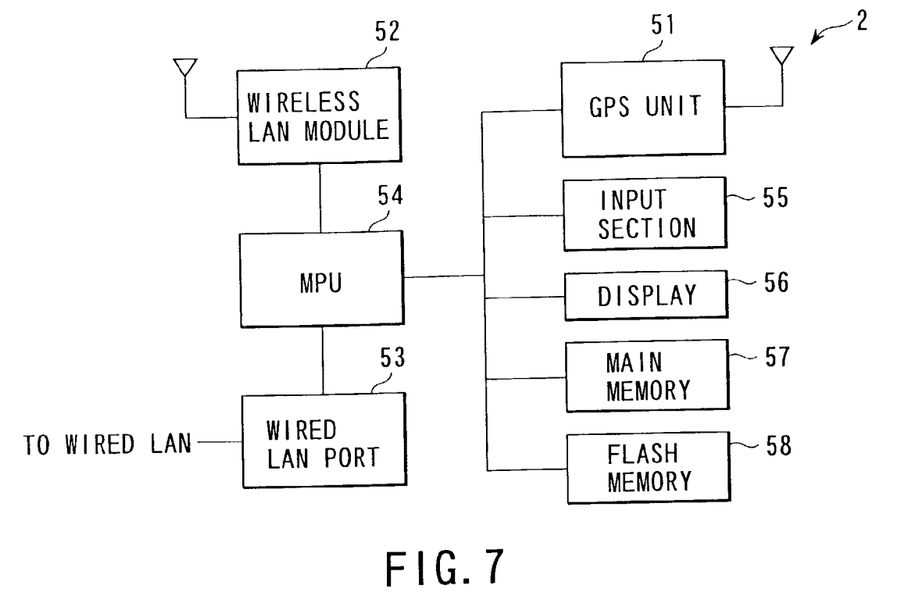
FIG. 7 is a block diagram showing an example of the structure of an access point shown in FIG. 1.

FIG. 7 is a block diagram showing an example of the structure of the access point 2 shown in FIG. 1.

A GPS unit 51 receives radio waves from the GPS satellite 3 and acquires its own position information.

A wireless LAN module 52 is controlled by an MPU 54 and performs wireless LAN communication with a wireless LAN communication function provided in some other device.

A wired LAN port 53 performs reception/transmission of packets over a wired LAN.

The MPU 54 controls the entirety of the access point 2 and performs on a main memory 57 programs that realize, e.g., the radio communication setting method according to the present embodiment.

An input section 55 enables the user to perform input operations.

A display 56 displays a connection state with the wireless LAN or wired LAN.

The main memory 57 stores various programs and data to be executed by the MPU 54 and is provided as a work area for the MPU 54.

A flash memory 58 stores position information or setting information to be sent to the PC 1.

Figure 8:
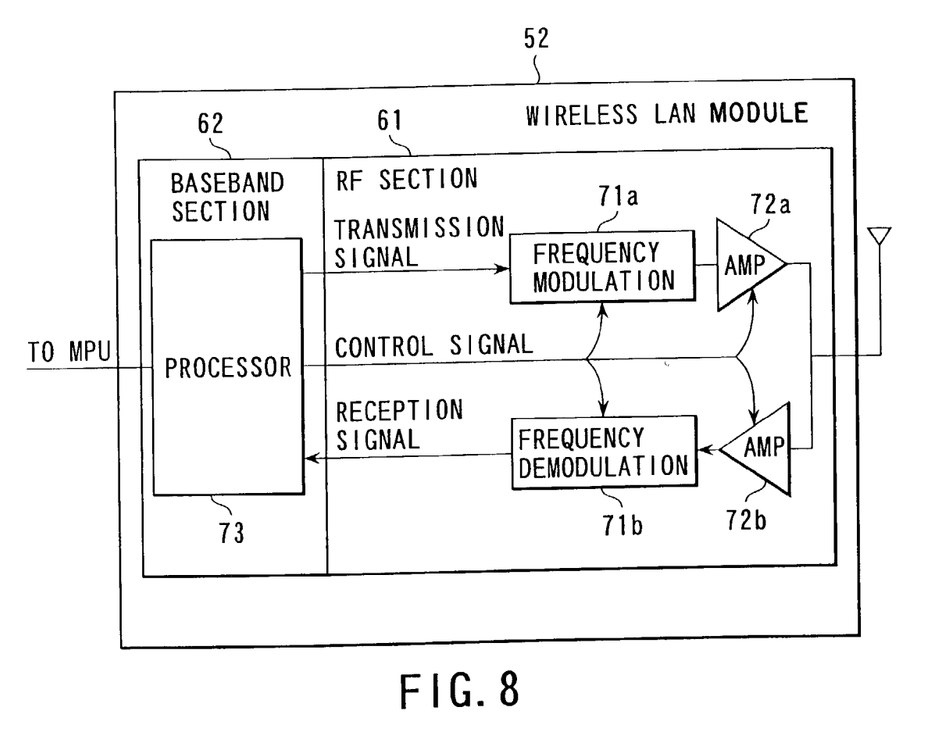
FIG. 8 is a block diagram showing an example of the internal structure of a wireless LAN module shown in FIG. 7.

FIG. 8 is a block diagram showing an example of the internal structure of the wireless LAN module 52 shown in FIG. 7.

The wireless LAN module 52 includes similar structural elements to the module of the wireless LAN card 14 (including RF section 31 and baseband section 32) shown in FIG. 6, and a detailed description thereof is omitted.

In this wireless LAN module 52, too, a processor 73 of a baseband section 62 sends control signals to a frequency modulation section 71a, a frequency demodulation section 71b and amplifiers 72a and 72b of an RF section 61. The control signals set and alter the frequencies and power values of transmission signals to be transmitted to the outside from the access point 2 and reception signals to be received by the access point 2 from the outside.

Figure 9:
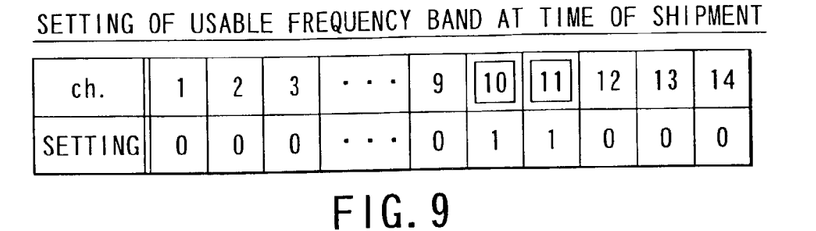
FIG. 9 shows a setting table for frequency bands (channels) before PC shipment, which is registered in a flash memory shown in FIG. 5.

FIG. 9 shows a setting table for frequency bands (channels) before PC shipment, which is registered in the flash memory 20 shown in FIG. 5.

As has been described with reference to FIG. 3, the worldwide usable channels are Ch. 10 and Ch. 11. Thus, in the PC 1 before shipment, a flag associated with Ch. 10–11 is expressed by "1". Flags associated with the other channels are expressed "0". The CPU 19 sets such setting information onto the operation of the wireless LAN card 14.

Figure 10:
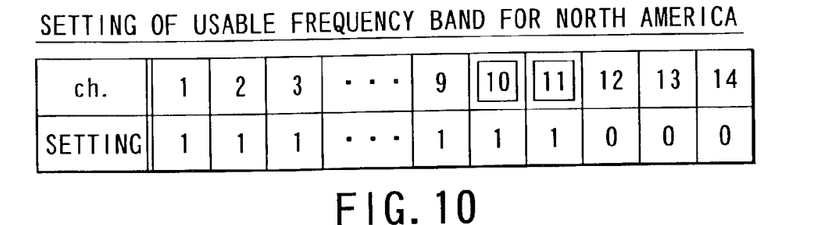
FIG. 10 shows a setting table for frequency bands (channels) conforming to the North American radio communication standard.
Figure 11:
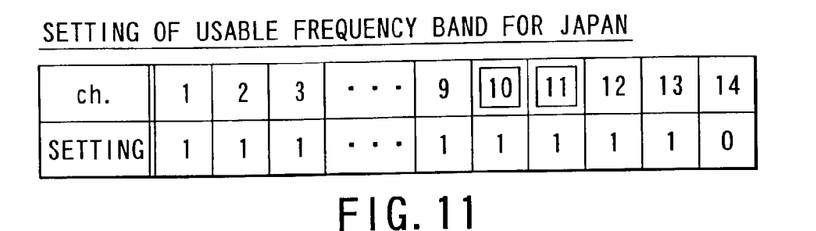
FIG. 11 shows a setting table for frequency bands (channels) conforming to the Japanese radio communication standard.

When the PC 1 is shipped to North America, the setting is altered such that a flag associated with Ch. 1–11, which conforms to the North American radio communication standard as shown in FIG. 10, is expressed by "1", and the other flags are expressed by "0". When the PC 1 is shipped within Japan, the setting is altered such that a flag associated with Ch. 1–13, which conform to the Japanese radio communication standard as shown in FIG. 11, is expressed by "1", and the other flags are expressed by "0". The CPU 19 sets such setting information onto the operation of the wireless LAN card 14.

Figure 12:
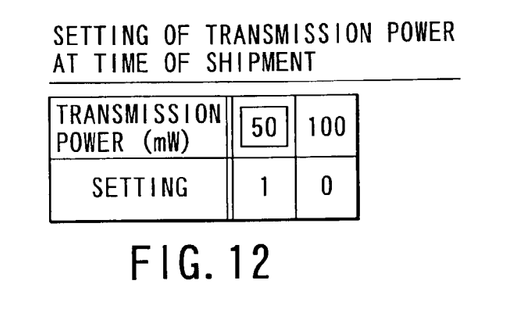
FIG. 12 shows a setting table for maximum transmission powers before PC shipment, which is registered in the flash memory shown in FIG. 5.

FIG. 12 shows a setting table for maximum transmission powers before PC shipment, which is registered in the flash memory 20 shown in FIG. 5.

As has been described with reference to FIG. 4, the worldwide usable maximum transmission power is 50 mW. Thus, in the PC 1 before shipment, a flag associated with 50 mW is expressed by "1". Flags associated with the other transmission powers are expressed "0". The CPU 19 sets such setting information onto the operation of the wireless LAN card 14.

Figure 13:
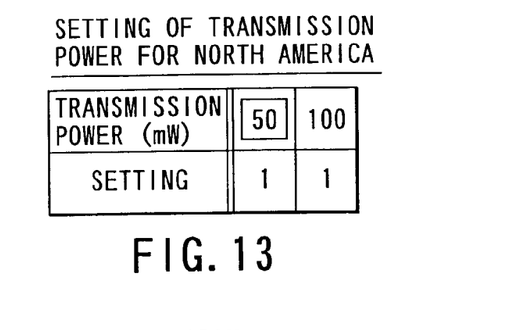
FIG. 13 shows a setting table for transmission powers conforming to the North American radio communication standard.
Figure 14:
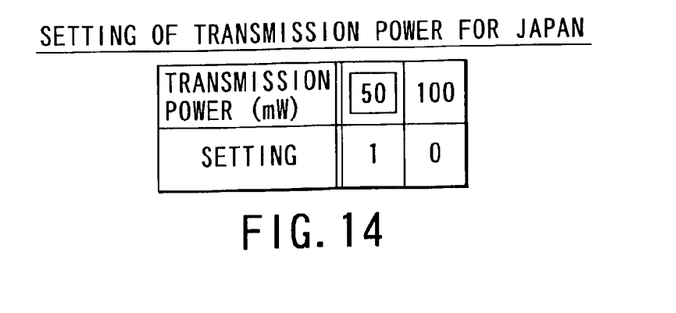
FIG. 14 shows a setting table for transmission powers conforming to the Japanese radio communication standard.

When the PC 1 is shipped to North America, the setting is altered such that a flag associated with 50 mW and 100 mW, which conform to the North American radio communication standard as shown in FIG. 13, is expressed by "1". When the PC 1 is shipped within Japan, a flag associated with 50 mW, which conforms to the Japanese radio communication standard as shown in FIG. 14, is expressed by "1", and the other flags remain expressed by "0".

Figure 15:
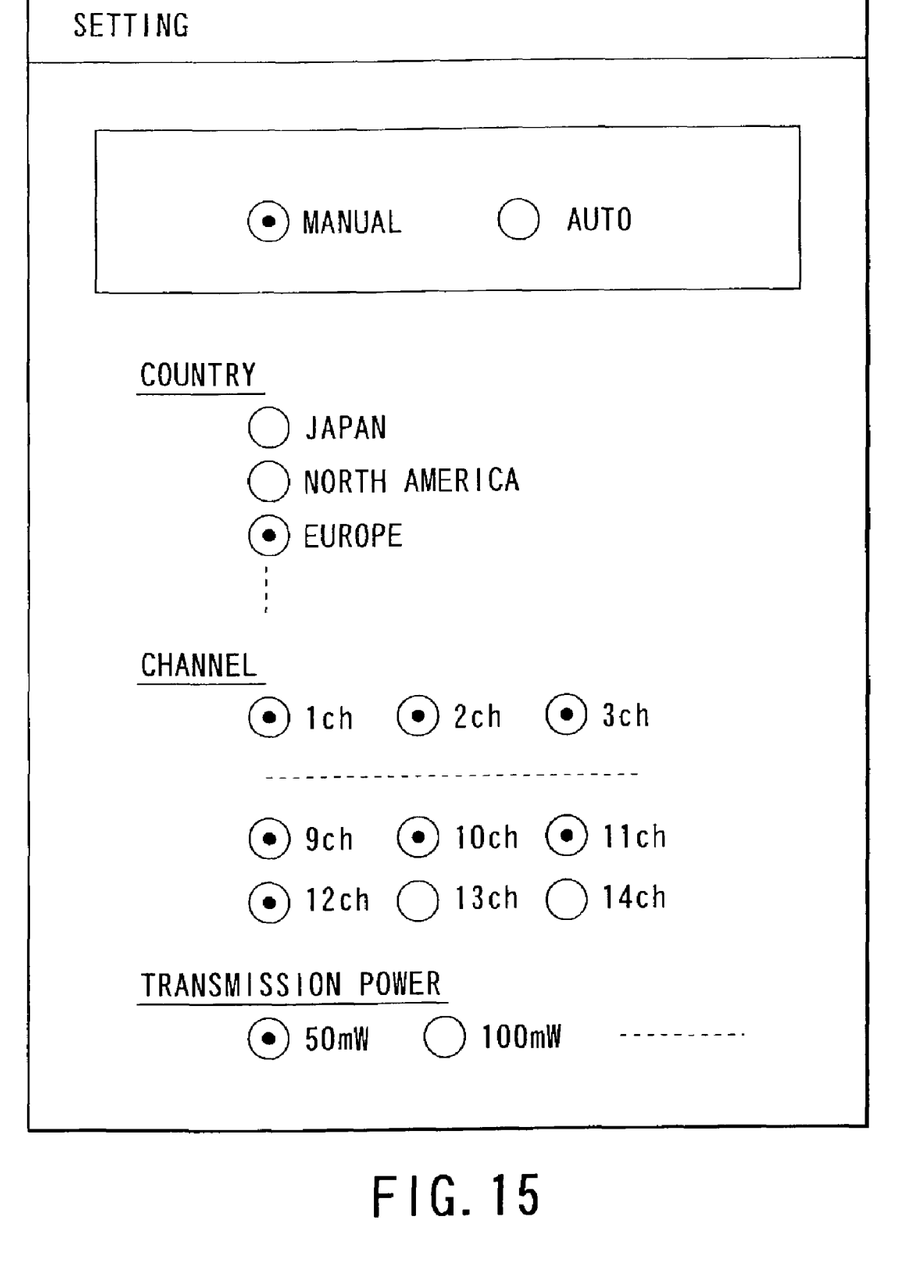
FIG. 15 shows a setting table for changing setting information on a display by a user.

FIG. 15 shows a setting table for changing settings on the display 18 by the user.

In the PC 1, "AUTO" is designated as a default on the setting screen. Thereby, even without paying attention to the radio communication standard in the region (country) for shipment, automatic setting is effected so as to conform to the radio communication standard in that country under control of the CPU 19. On the other hand, when the user is unable to acquire position information in the country for shipment, there may be a case where the usable frequency range and transmission power need to be individually set. There may also be a case where the user wishes to customize setting information. In such cases, "MANUAL" on the setting screen is designated for freely setting such information.

In FIG. 15, when "COUNTRY" is designated, the "CHANNEL" and "TRANSMISSION POWER" conforming to the radio communication standard in the designated country can be displayed. Of course, the setting content of the "CHANNEL" and "TRANSMISSION POWER" can be manually altered.

Figure 16:
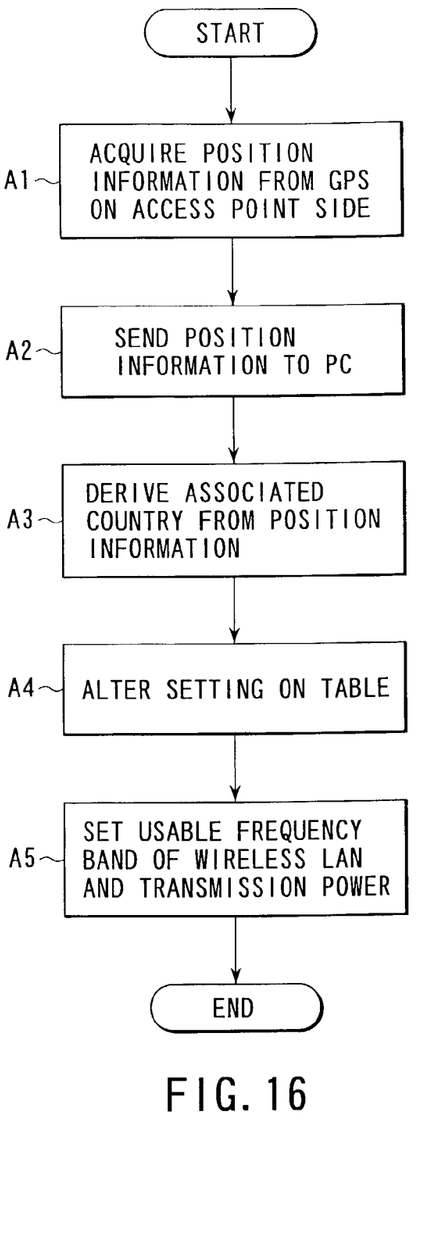
FIG. 16 is a flow chart illustrating an example of operations for realizing a radio communication setting method according to the embodiment.

Referring now to FIG. 16, an example of the operation for realizing the radio communication setting method according to the embodiment will now be described.

When radio communication between the access point 2 and the client PC 1 is started, the PC 1 is set in a receiving standby state and waits for a beacon signal from the access point 2.

If the access point 2 receives radio waves from the GPS satellite 3 and acquires its own position information (step A1), it sends a beacon signal containing the position information to the PC 1 over the wireless LAN (step A2).

If the PC 1 receives the beacon signal containing the position information from the access point 2, it starts initializing the wireless LAN function of the PC 1.

Specifically, the PC 1 analyzes the position information sent from the access point 2, derives the country to which the position indicated by the position information belongs (i.e. acquires country information indicating the country where the PC 1 is present) (step A3), and updates the setting information on the setting table in the flash memory 20 so as to conform to the radio communication standard of the derived country (step A4). At the same time, the updated setting information is set onto the operations (frequency band, transmission power) of the wireless LAN card 14 (step A5).

On the side of access point 2, too, the setting information in the flash memory 58 is updated so as to conform to the radio communication standard of the country to which the position indicated by the acquired position information belongs, and at the same time, the updated setting information is set onto the operations (frequency band, transmission power) of the wireless LAN module 52.

In step A2, the "position information" is sent to the PC 1. Alternatively, the access point 2 may generate "setting information" conforming to the radio communication standard of the country to which the position indicated by the position information belongs, and the generated setting information may be sent to the PC 1 by a command. In this case, the PC 1 side may merely update the setting information in the flash memory 20 with the setting information sent from the access point 2, and set the updated setting information onto the operations of the radio communication function.

Figure 17:
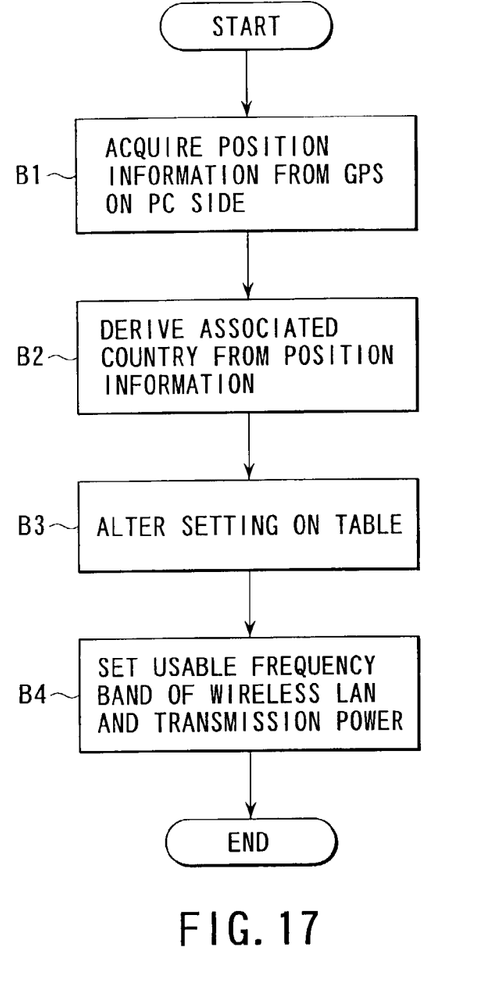
FIG. 17 is a flow chart illustrating another example of operations for realizing a radio communication setting method according to the embodiment.

Referring now to FIG. 17, another example of the operation for realizing the radio communication setting method according to the embodiment will now be described.

In this example, assume that the access point 2 does not have the function of sending the "position information" or "setting information" to the PC 1.

In this case, the PC 1 receives radio waves from the GPS satellite 3 and acquires its own position information (step B1), and derives the country to which the position indicated by the position information belongs (step B2). Then, the PC 1 updates the setting information on the setting table in the flash memory 20 so as to conform to the radio communication standard of the derived country (step B3). At the same time, the updated setting information is set onto the operations (frequency band, transmission power) of the radio communication function (step B4).

According to the present embodiment, the radio communication function of the information processing apparatus is automatically set so as to conform to the radio communication standard of the country for shipment. Thus, the user can easily exhibit the radio communication function of the apparatus to a maximum, without the need to pay attention to the radio communication standards in the respective countries.

The position information is acquired using the GPS satellite. Thereby, even if the information processing apparatus is moved to any country, the radio communication function of the apparatus can always correctly be set to the radio communication standard of the country where the apparatus has been moved.

According to the present embodiment, the setting information can advantageously be altered manually, when the position information cannot be acquired or the setting information is to be customized by the user.

The present invention is not limited to the above embodiment, and various modifications may be made without departing from the spirit of the invention.

For example, the radio communication function of the information processing apparatus may be built in the apparatus or externally provided in the form of a card, etc.

In the above embodiment, the wireless LAN function is applied to the radio communication function. Alternatively, a Bluetooth communication function, for instance, may be applied.

As has been described above in detail, the present invention enables the information processing apparatus to fully exhibit the operational performance of the radio communication function in a country for shipment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
a communication unit capable of executing communication;
a memory configured to store first setting information that enables communication in a first region, second setting information that enables communication in a second region, and third setting information that enables communication in the first and second regions, the first and second setting information including the third setting information, the third setting information being initially set in the memory, the first and second setting information other than the third setting information being not initially set in the memory;
an acquiring unit configured to acquire region information relating to a region where the apparatus is present; and
a processing unit configured to change setting information set in the memory from the third setting information to one of the first and second setting information, and configured to set the changed one of the first and second setting information onto operations of the communication unit, on the basis of the region information acquired by the acquiring unit.

2. The information processing apparatus according to claim 1, wherein each of the setting information includes information indicative of at least one of a usable frequency band and a transmission power.

3. The information processing apparatus according to claim 1, wherein the acquiring unit acquires the region information using a global positioning system (GPS).

4. The information processing apparatus according to claim 1, wherein the acquiring unit acquires the region information from another communication device capable of communicating with the communication unit.

5. The information processing apparatus according to claim 1, wherein the region information includes country information.

6. The information processing apparatus according to claim 1, wherein the region information includes position information.

7. A communication setting method for an information processing apparatus having a communication unit capable of executing communication, the method comprising:
storing first setting information that enables communication in a first region, second setting information that enables communication in a second region, and third setting information that enables communication in the first and second regions, in a memory provided to the information processing apparatus, the first and second setting information including the third setting information, the third setting information being initially set in the memory, the first and second setting information other than the third setting information being not initially set in the memory;
acquiring region information relating to a region where the apparatus is present; and
changing setting information set in the memory from the third setting information to one of the first and second setting information, and setting the changed one of the first and second setting information onto operations of the communication unit, on the basis of the acquired region information.

8. The communication setting method according to claim 7, wherein the region information is acquired using a global positioning system (GPS).

9. The communication setting method according to claim 7, wherein each of the setting information includes information indicative of at least one of a usable frequency band and a transmission power.

10. The communication setting method according to claim 7, wherein the communication unit includes a wireless LAN communication unit.

* * * * *